(12) United States Patent
Shin

(10) Patent No.: US 7,808,630 B2
(45) Date of Patent: Oct. 5, 2010

(54) INSPECTION APPARATUS FOR LIQUID CRYSTAL DISPLAY DEVICE AND INSPECTION METHOD USING SAME

(75) Inventor: Jae Ho Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 11 days.

(21) Appl. No.: 12/314,508

(22) Filed: Dec. 11, 2008

(65) Prior Publication Data

US 2009/0219521 A1 Sep. 3, 2009

(30) Foreign Application Priority Data

Feb. 29, 2008 (KR) ...................... 10-2008-0019207

(51) Int. Cl.
*G01N 21/88* (2006.01)
(52) U.S. Cl. .................................... 356/239.1; 349/149
(58) Field of Classification Search ... 356/237.1–237.5, 356/239.1–239.4, 239.7, 239.8; 349/187, 349/192, 40, 139, 149
See application file for complete search history.

(56) References Cited

U.S. PATENT DOCUMENTS

| 5,734,158 | A | * | 3/1998 | Nagashima et al. | ......... | 250/225 |
| 5,793,221 | A | * | 8/1998 | Aoki | .......................... | 324/770 |
| 6,774,958 | B2 | | 8/2004 | Kweon et al. | ................. | 349/40 |
| 6,973,209 | B2 | * | 12/2005 | Tanaka | ........................ | 382/149 |
| 2006/0050223 | A1 | * | 3/2006 | Umetsu | ....................... | 349/192 |
| 2007/0046321 | A1 | * | 3/2007 | Kang et al. | .................. | 324/770 |
| 2009/0015825 | A1 | * | 1/2009 | Chung | ..................... | 356/239.2 |

FOREIGN PATENT DOCUMENTS

| CN | 1441303 A | | 9/2003 |
| CN | 1501073 A | | 6/2004 |
| JP | 41016060628 | * | 6/1998 |

* cited by examiner

*Primary Examiner*—Hoa Q Pham
(74) *Attorney, Agent, or Firm*—Morgan, Lewis & Bockius LLP

(57) ABSTRACT

An inspection apparatus and inspection method for liquid crystal display devices are disclosed, wherein a final inspection for completely manufactured liquid crystal display devices is performed using a visual-light inspection apparatus, whereby high productivity due to improved inspection accuracy and reduced inspection time can be accomplished. With the inspection apparatus and inspection method, defects of a plurality of glass panels can be automatically inspected based on analyzed information of an entire screen of each glass panel using a plurality of vision cameras, whereby improved inspection accuracy and improved product quality can be accomplished and reduced inspection time can result in improved productivity of liquid crystal display devices. Further, by quantifying screen defects of the plurality of glass panels, defects of glass panels due to failures of manufacturing processes or design failures and other problems attendant on the defects can be prevented.

9 Claims, 7 Drawing Sheets

INSPECTION APPARATUS FOR LIQUID CRYSTAL DISPLAY DEVICE AND INSPECTION METHOD USING SAME

This application claims the benefit of the Korean Patent Application No. P2008-19207, filed on Feb. 29, 2008, which is hereby incorporated by reference as if fully set forth herein.

BACKGROUND OF THE INVENTION

1. Field of the Invention

The present invention relates to an inspection apparatus for liquid crystal display devices and an inspection method using the same, and more particularly, to an inspection apparatus and inspection method for liquid crystal display devices, wherein a final inspection for completely manufactured liquid crystal display devices is performed using a visual-light inspection apparatus, whereby high productivity due to improved inspection accuracy and reduced inspection time can be accomplished.

2. Discussion of the Related Art

Information-dependent society stresses the importance of display devices as visual information transfer media, and many kinds of flat panel display devices have been developed.

Flat panel display devices include Liquid Crystal Display (LCD) devices, Field Emission Display (FED) devices, Plasma Display Panels (PDPs), Electro-Luminescent (EL) devices, and Organic Light Emitting Diodes (OLEDs), and the like.

Currently, liquid crystal display devices have advantageous characteristics, for example, light-weight, thin-thickness, low power-consumption driving, and the application range of liquid crystal display devices is gradually increasing. According to this trend, liquid crystal display devices are most widely used in laptop computers, office automation equipment, audio/video appliances, indoor/outdoor advertising display apparatuses, and the like. Moreover, by virtue of recently developed mass-production technologies and research and development results, liquid crystal display devices exhibit a rapid development up to a large size and a high resolution.

Such liquid crystal display devices are designed to display an image by adjusting light transmittance of liquid crystal cells according to input image signals.

Now, a method of manufacturing a liquid crystal display device will be described. The manufacturing method comprises: forming a Thin Film Transistor (TFT) array on a lower substrate; forming a color filter array on an upper substrate; bonding the upper and lower substrates to each other; injecting liquid crystals into a gap between the two bonded substrates and sealing the gap to thereby form a liquid crystal panel; testing the liquid crystal panel having the injected liquid crystals and repairing a defective liquid crystal panel; performing a final inspection on a completely manufactured liquid crystal panel according to a predetermined inspection method, to determine whether or not the manufactured liquid crystal panel is a good product or a defective product; and mounting a backlight unit and drive circuits to the liquid crystal panel determined as a good product, to thereby complete the manufacture of a liquid crystal display device.

FIG. 1 is a view illustrating the configuration of a general liquid crystal display device.

Referring to FIG. 1, the liquid crystal display device 1 includes a liquid crystal panel 10 in which a plurality of liquid crystal cells are arranged in a matrix between two upper and lower glass substrates, the liquid crystal panel 10 serving to display an image, a backlight unit 60 to irradiate light to the liquid crystal panel 10, and drivers 20, 30, 40 and 50 to apply drive signals required to drive the liquid crystal panel 10.

The liquid crystal panel 10 includes thin film transistors (hereinafter, referred to as TFTs) formed at intersections of a plurality of gate lines GL1 to GLn and a plurality of data lines DL1 to DLm extending orthogonal to each other, and the liquid crystal cells connected to the TFTs. The TFTs serve to supply image data, supplied from the data lines DL1 to DLm, to the liquid crystal cells, in response to scan signals supplied from the gate lines GL1 to GLn.

The liquid crystal cells include common electrodes and pixel electrodes connected to the TFTs, the common electrodes and the pixel electrodes being arranged to oppose each other with liquid crystals interposed therebetween. With this configuration, the liquid crystal cells can be said to be equivalent to liquid crystal capacitors Clc. In addition, the liquid crystal cells include storage capacitors Cst to maintain a data voltage charged in the liquid crystal capacitors Clc until a next data voltage will be charged. A common voltage Vcom is supplied to the common electrodes of the liquid crystal cells. Meanwhile, in the case of an in-plane switching (IPS) mode liquid crystal display device, common electrodes are formed on a lower substrate.

FIG. 2 is a flow chart illustrating manufacturing processes of a liquid crystal panel. Now, the manufacturing processes of the above-described liquid crystal panel 10 will be described with reference to FIG. 2.

The manufacturing processes of the liquid crystal panel 10 may broadly consist of a TFT array process for forming driving elements on a lower substrate, and a color filter array process for forming color filters and cells on an upper substrate.

First, in the TFT array process (S101), a plurality of gate lines and data lines are formed on the lower substrate, to define pixel areas, and TFTs as driving elements are formed at the respective pixel areas such that the TFTs are connected to both the gate lines and data lines. In addition, pixel electrodes are formed in the TFT array process. The pixel electrodes serve to drive a liquid crystal layer upon receiving signals applied thereto through the TFTs.

In the color filter array process (S104), a color filter layer, which consists of Red, Green and Blue color filters, and common electrodes are formed on the upper substrate.

Next, after applying alignment films to the respective upper and lower substrates to provide the liquid crystal layer formed between the upper and lower substrates with a predetermined alignment direction, the alignment films are subjected to a rubbing process (S102 and S105).

Thereafter, spacers are distributed over the lower substrate, to maintain a constant cell gap (S103). Then, after applying a sealant to an outer rim of the upper substrate (S106), both the upper and lower substrates are bonded to each other under pressure, to form a liquid crystal panel (S107).

Both the upper and lower substrates of the liquid crystal panel are formed of glass substrates and therefore, the large-area glass substrates are subjected to a cutting process (S108), thereby being divided into a plurality of liquid crystal panels.

Subsequently, liquid crystals are injected into the respective liquid crystal panels, and then, liquid crystal injection ports of the respective liquid crystal panels are sealed, to form a liquid crystal layer (S109). Thereafter, an inspection operation to determine whether or not each liquid crystal panel is efficiently manufactured is carried out (S110).

Drivers to drive the liquid crystal panel manufactured via the above-described method include a gate driver 30, a data driver 20, a timing controller 40, a gamma voltage generator (not shown), and a voltage generator 50. The gate driver 30 is provided with a plurality of gate driver ICs to sequentially supply scan signals to the respective gate lines GL1 to GLn formed in the liquid crystal panel 10. The data driver 20 is provided with a plurality of data driver ICs to convert digital image data into analogue image data and supply the analogue image data to data lines DL1 to DLm so as to synchronize the analogue image data with the scan signals. The timing controller 40 serves not only to align the digital image data input from an external station so as to supply the aligned digital image data to the data driver 20, but also to control driving of the data driver 20, the gate driver 30 and the voltage generator 50. The gamma voltage generator (not shown) supplies a reference gamma voltage to the data driver 20, and the voltage generator 50 supplies drive power to the above-mentioned backlight unit 60 and the respective drivers.

The liquid crystal panel 10 has no self-illumination function and thus, requires light sources such as lamps. Conventionally, to irradiate light to the liquid crystal panel 10, the backlight unit 60, which consists of a plurality of lamps and optical members, is used.

Specifically, the backlight unit 60, used to irradiate light to the liquid crystal panel 10, includes a plurality of lamps to emit light, a diffusing plate (light guide plate) to diffuse light emitted from the plurality of lamps, a reflecting plate (reflecting sheet) to reflect the light emitted from the plurality of lamps toward the liquid crystal panel 10 so as to reduce loss of light, and a plurality of optical sheets to polarize, condense, and diffuse the light from the diffusing plate (light guide plate).

The backlight unit 60 may be classified, according to the arrangement of light sources, into a side-light type and a direct-light type. In particular, in the direct-light type, a plurality of light sources such as fluorescent lamps are arranged on a rear surface of the liquid crystal panel 10, so as to directly irradiate light to an entire surface of the liquid crystal panel 10. The direct-light type has advantages of high uniformity and brightness of light to be irradiated to the liquid crystal panel 10 and thus, is advantageous for use in a large-size liquid crystal display device.

Generally, the light sources of the direct-light type backlight unit 60 are continuously driven to irradiate a uniform intensity of light to an entire rear surface of the liquid crystal panel 10, and the liquid crystal panel 10 displays an image by controlling transmittance of the light irradiated from the light sources.

Once the liquid crystal display device having the above-described configuration is manufactured via the above-described manufacturing processes, prior to completing the manufacture of the liquid crystal display device, the liquid crystal display device is subjected to a final macroscopic inspection with the naked eye, to determine whether the manufactured liquid crystal panel 10 is a good product or a defective product.

FIGS. 3 and 4 are views illustrating a related art inspection method of inspecting the completely manufactured liquid crystal panel.

Referring to FIGS. 3 and 4, in the above-described related art inspection apparatus and inspection method for liquid crystal display devices, the liquid crystal display device 1, which incorporates the backlight unit 60 and the liquid crystal panel 10, is subjected to a macroscopic inspection with the naked eye, to determine whether the liquid crystal panel 10 is a good product or a defective product.

For this, the related art inspection apparatus for liquid crystal display devices includes a carrier 70 to sequentially transport each of a plurality of liquid crystal display devices 1 to a predetermined inspection position close to an inspector, a lifter 80 to move the inspector up and down to facilitate a macroscopic inspection of the liquid crystal panel 10 having a large-size screen, and an upper polarizer 90 to allow the inspector to visually inspect whether or not a certain section of the liquid crystal panel 10 has defects.

In the related art inspection method using the above-described inspection apparatus for the liquid crystal display device 1, first, the liquid crystal display device 1 is moved to the inspection position close to the inspector by operation of the carrier 70. Next, as the backlight unit of the liquid crystal display device 1 is driven, a test image for inspection of the liquid crystal panel 10 is displayed on the liquid crystal panel 10. Thereafter, in a state wherein the upper polarizer 90 for a macroscopic inspection is located in front of the liquid crystal panel 10, the inspector visually inspects whether or not a certain section of the liquid crystal panel 10 has defects while being moved up and down by operation of the lifter 80.

Here, the inspector inspects the presence of defects in a Twisted Nematic (TN) mode and an IPS mode by rotating the upper polarizer 90 for a macroscopic inspection by an angle of 45°, 90° or 180°. The TN mode inspection is used to inspect gap defects of liquid crystal cells and other defects due to impurities, and the IPS mode inspection is used to inspect rubbing defects caused during a rubbing process.

The above-described related art inspection apparatus and inspection method for liquid crystal display devices are based on a macroscopic inspection in which the inspector visually inspects a liquid crystal display device under operation of a backlight unit. However, due to an increasing size of liquid crystal display devices, the above-described related art inspection method has several disadvantages of requiring an extended inspection time required for the inspector to visually inspect defects several times. This consequently deteriorates productivity of liquid crystal display devices.

Furthermore, with the above-described related art inspection apparatus for liquid crystal display devices that depends on visual inspection by the inspector, accurately inspecting fine defects in the unit of pixels is difficult, and different inspection results may occur according to the inspector's skill. In conclusion, it is very difficult to maintain uniform product quality.

SUMMARY OF THE INVENTION

Accordingly, the present invention is directed to an inspection apparatus for liquid crystal display devices and an inspection method using the same that substantially obviate one or more problems due to limitations and disadvantages of the related art.

An object of the present invention is to provide an inspection apparatus for liquid crystal display devices and an inspection method using the same, which can achieve a reduction in inspection time and costs via automated inspection of a liquid crystal panel screen.

Another object of the present invention is to provide an inspection apparatus for liquid crystal display devices and an inspection method using the same, which can achieve improved inspection accuracy of a liquid crystal panel screen and consequently, improved quality of liquid crystal display device products.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an inspection apparatus of inspecting a screen defect of a liquid crystal display device comprising: a carrier to sequentially transport each glass panel having passed through a previous process station; a backlight unit to irradiate light to a lower surface of the glass panel being transported by the carrier; an exterior-light shield to define a darkroom in a region, to which the light is irradiated by the backlight unit, for inspection of a screen defect of the glass panel; a plurality of vision cameras mounted in the exterior-light shield, to sense an entire display region of the glass panel; and an analyzing system to collect and analyze information sensed by the plurality of vision cameras.

In accordance with another aspect of the invention, there is provided an inspection apparatus for liquid crystal display devices comprising: sequentially transporting a plurality of glass panels into a darkroom by operation of a carrier; irradiating light to a lower surface of each glass panel transported into the darkroom; sensing optical signals emitted from the glass panel and converting the optical signals into digital sensing signals by use of a plurality of vision cameras mounted in the darkroom; and collecting and analyzing the digital sensing signals to determine the presence of a defect of the glass panel on a per pixel basis.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
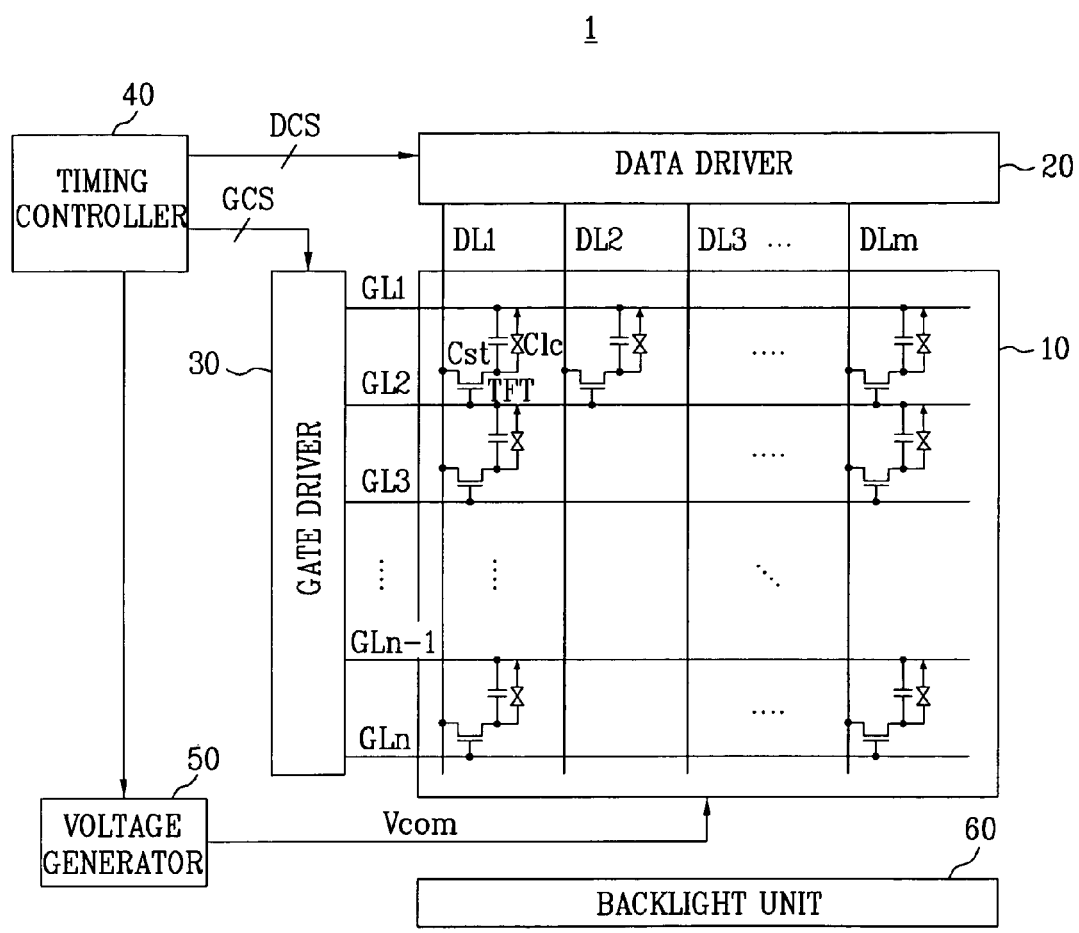
FIG. 1 is a view illustrating the configuration of a general liquid crystal display device.
Figure 2:
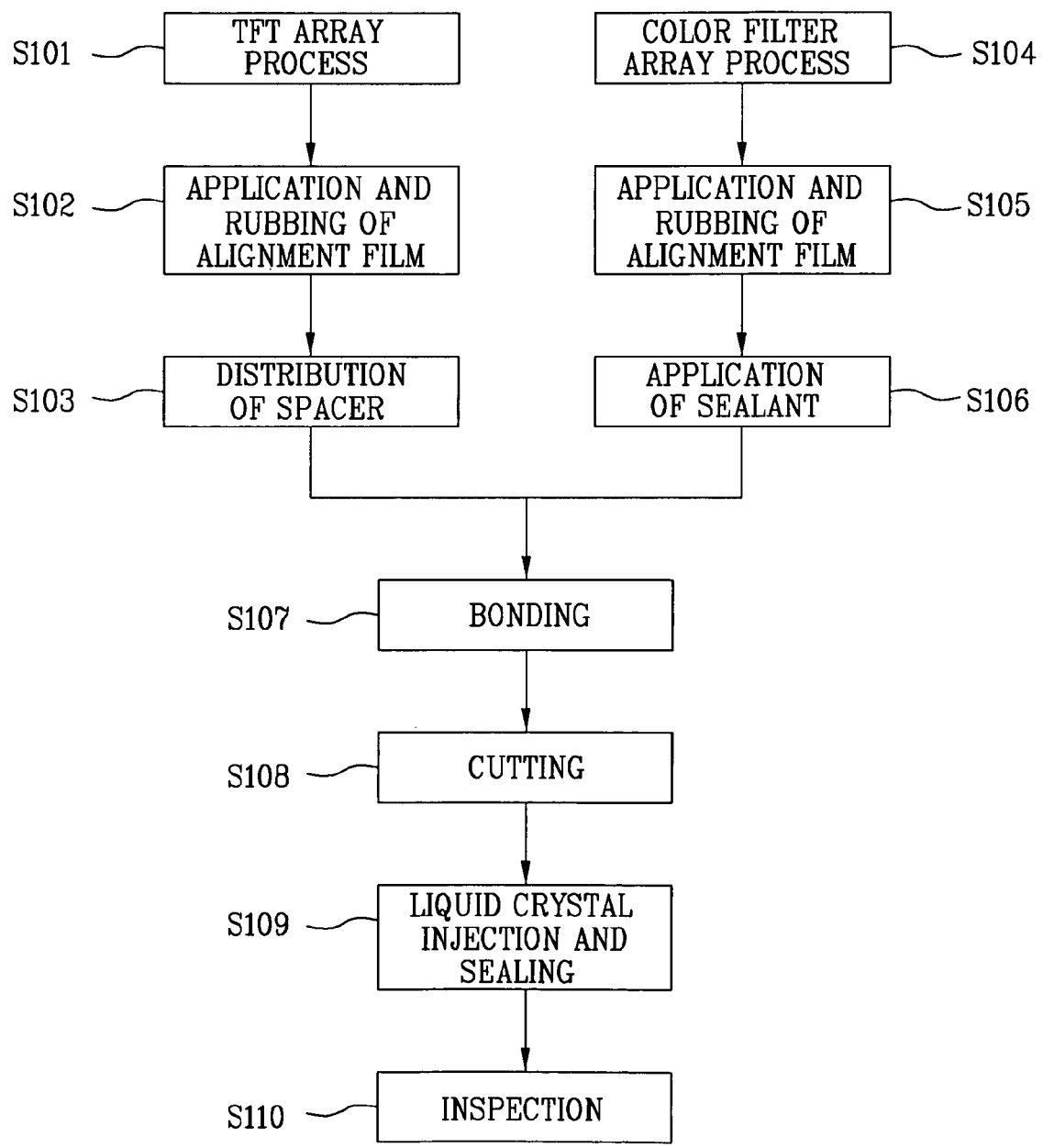
FIG. 2 is a flow chart illustrating manufacturing processes of a liquid crystal panel.
Figure 3:
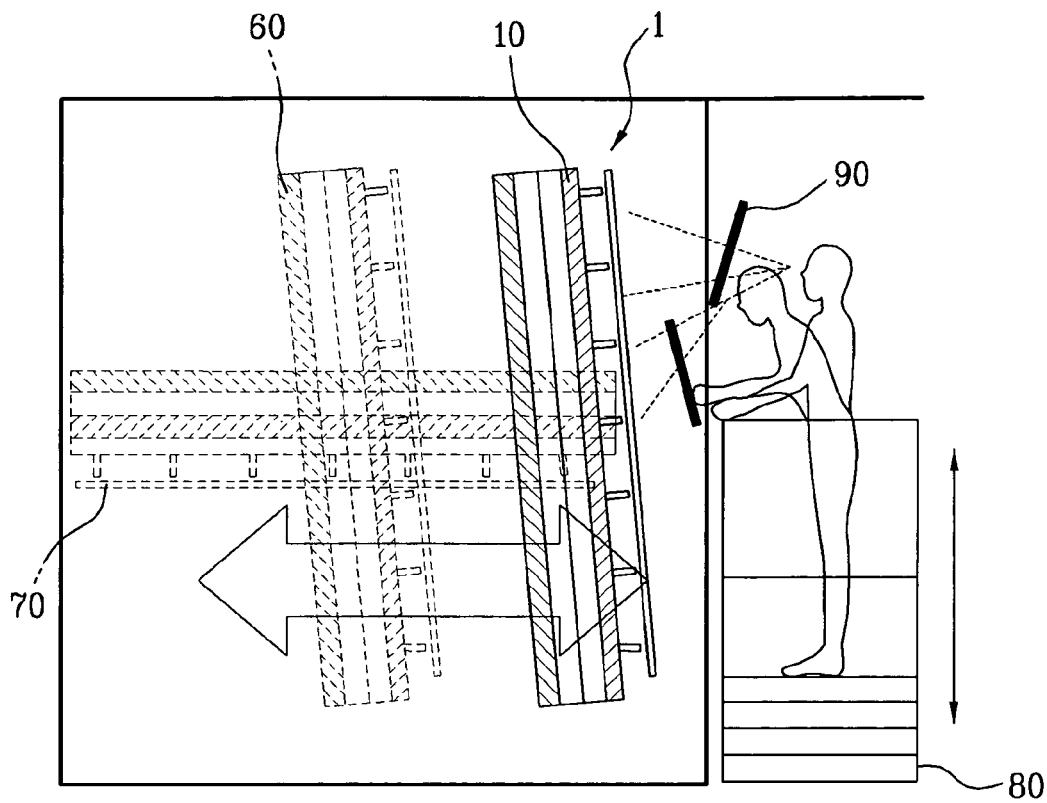
FIGS. 3 and 4 are views illustrating a related art inspection method for a completely manufactured liquid crystal panel.
Figure 4:
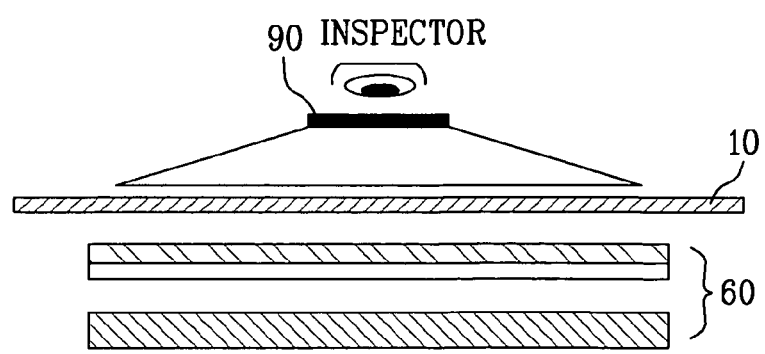
Figure 5:
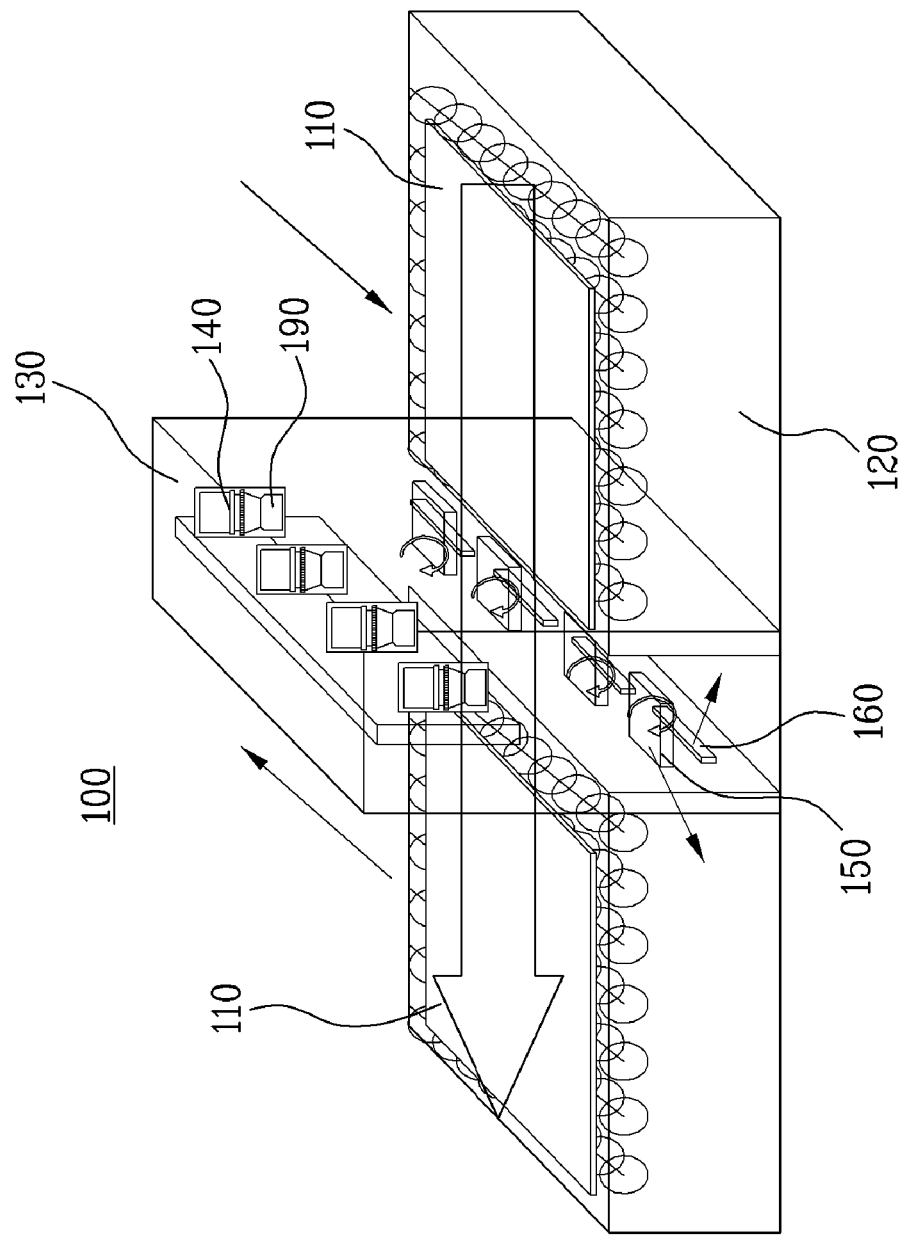
FIG. 5 is a view illustrating an inspection apparatus for liquid, crystal display devices according to an embodiment of the present invention.

FIG. 5 is a view illustrating an inspection apparatus for liquid crystal display devices according to an embodiment of the present invention.

Referring to FIG. 5, the inspection apparatus 100 for liquid crystal display devices according to the embodiment of the present invention includes: a carrier 120 to transport each large-size glass panel 110 having passed through a previous process station; a backlight unit 160 to irradiate light to a lower surface of the glass panel 110 that is being transported by the carrier 120; a lower polarizer 150 disposed above the backlight unit 160 to polarize the light to be irradiated to the glass panel 110; an exterior-light shield 130 to define a darkroom in an inspection region, to which the light is irradiated by the backlight unit 160, for inspection of defects of the glass panel 110; a plurality of vision cameras 140 mounted in the exterior-light shield 130 to sense an entire display region of the glass panel 110, and an analyzing system (not shown) to collect and analyze information sensed by the plurality of vision cameras 140.

Specifically, the lower polarizer 150 is rotated about a horizontal axis by an angle of 45°, 90°, 135° or 180° via operation of a rotator coupled thereto. Each of the plurality of vision cameras 140, mounted in the exterior-light shield 130, is provided with an upper polarizer 190 in the form a lens. The upper polarizer 190 may be rotated, in the same manner as the lower polarizer 150, by operation of a rotator provided in the vision camera 140.

Figure 6:
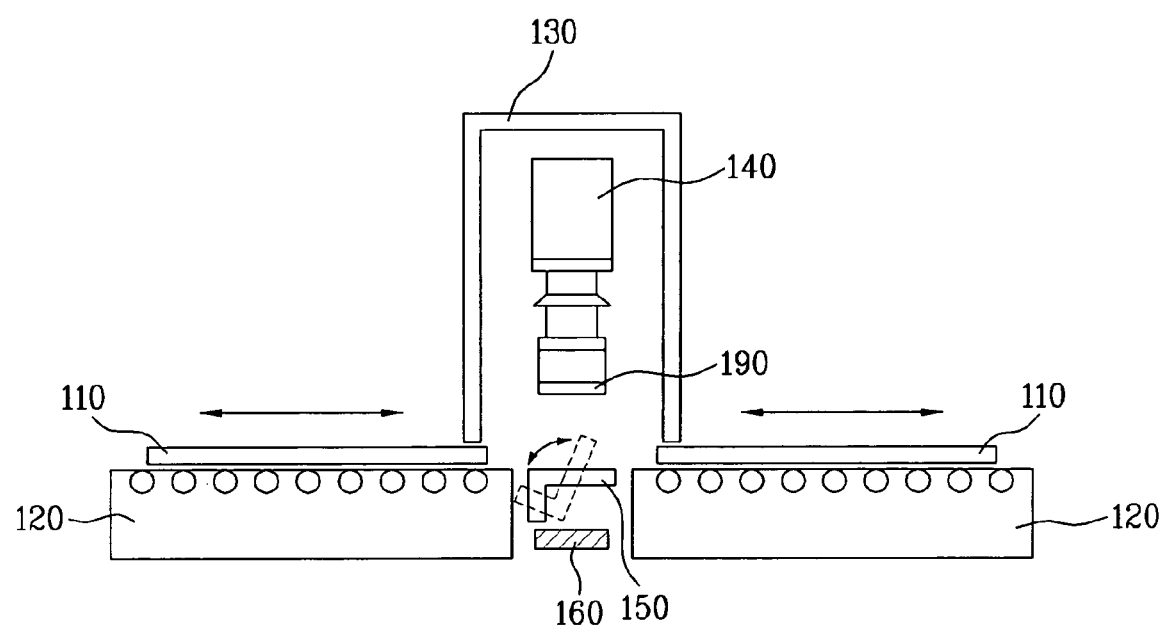
FIGS. 6 to 8 are views illustrating an inspection method using the inspection apparatus according to the embodiment of the present invention.

Although FIG. 5 illustrates the lower polarizer 150 being rotated about a horizontal axis by an angle of 45°, 90°, 135° or 180°, as shown in FIG. 6, the lower polarizer 150 may be configured to have two planes for a TN mode inspection and an IPS mode inspection. In this case, the lower polarizer 150, having the TN mode and IPS mode planes, is rotated up and down, so as to polarize the light irradiated from the backlight unit 160.

The exterior-light shield 130 provides a darkroom in an inspection region, to effectively inspect screen defects of the glass panel 110. Although FIG. 5 illustrates a hexahedral frame shape of the exterior-light shield 130, this is given only by way of example and the exterior-light shield 130 has no special limit in shape so long as it is made of an opaque material capable of shielding light irradiated from the outside. The exterior-light shield 130 contains the plurality of vision cameras 140 to sense the entire display region of the glass panel 110.

Each of the plurality of vision cameras 140 senses a display screen of the glass panel 110 and transmits the sensed information to the analyzing system. Specifically, the vision camera 140 converts optical signals, generated upon recognizing light incident thereon from the display screen of the glass panel 110, into electric signals, and quantifies the sensed information of the display screen of the glass panel 110 into digital signals.

The analyzing system collects the sensed information input from the plurality of vision cameras 140, thereby determining the presence of screen defects of the glass panel 110 on a per pixel basis. A method of determining the presence of screen defects of the glass panel 110 using the analyzing system will be described hereinafter with reference to FIGS. 6 to 8.

Figure 7:
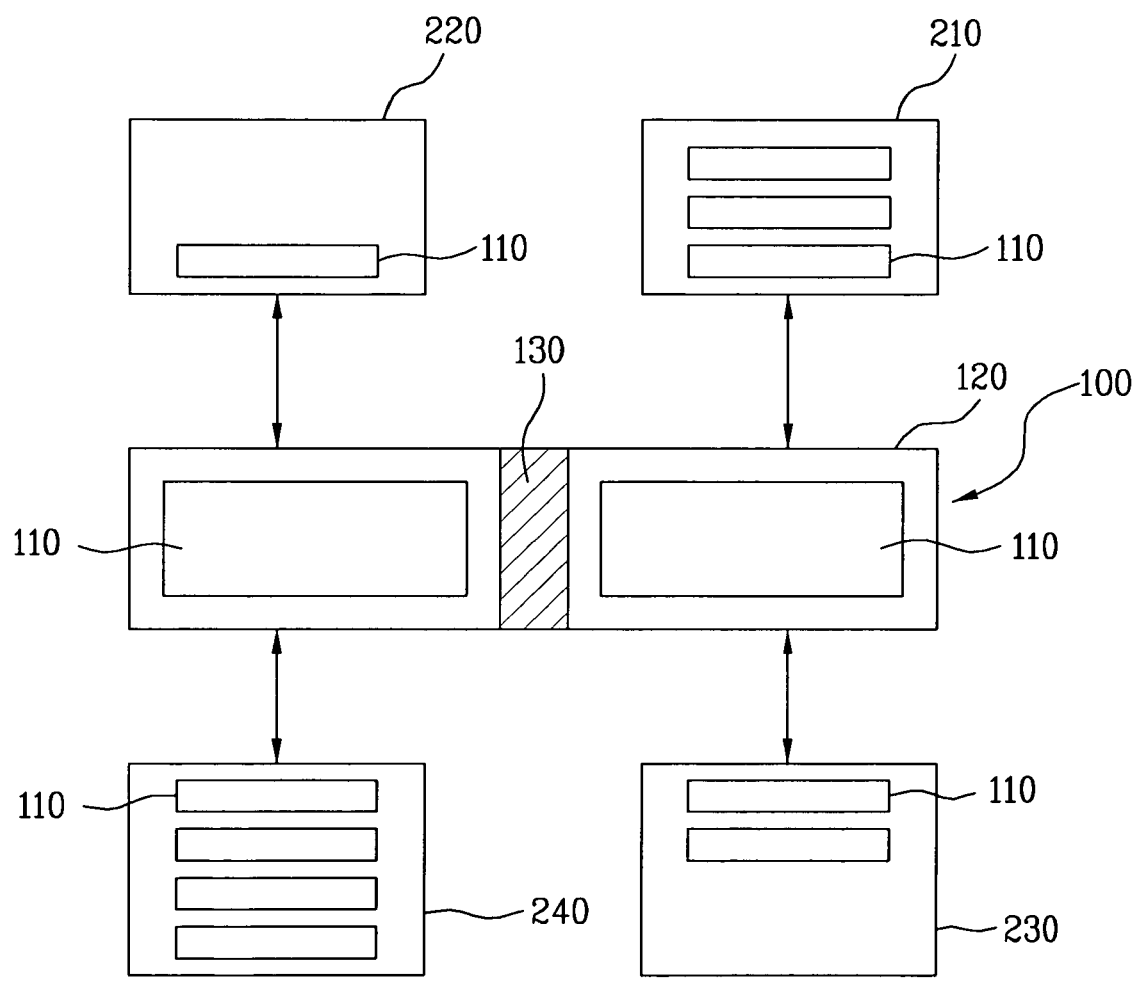

The carrier 120, as shown in FIG. 7, sequentially transports each of a plurality of the glass panels 110, having passed through a previous process station, i.e. a first cassette 210, to the exterior-light shield 130, i.e. to an inspection position. After being subjected to a screen inspection within the exterior-light shield 130, the inspected glass panel 110 is transported to any one of following process stations 220, 230 and 240, to thereby be subjected to a corresponding manufacturing process.

Considering the above-described process in more detail with reference to FIGS. 6 and 7, the plurality of glass panels 110, received in the first cassette 210, are sequentially transported to the inspection apparatus 100. Once being transported to the inspection apparatus 100, each glass panel 110 is first transported into the exterior-light shield 130 by the carrier 120. After the glass panel 110 is transported to an inspection position within the exterior-light shield 130, the backlight unit 160, located below the inspection position, is driven, to irradiate light to the glass panel 110.

In this case, the light from the backlight unit 160 is irradiated to a lower surface of the glass panel 110 by way of the lower polarizer 150. When no image signal is applied to the glass panel 110, the glass panel 110 represents white or black in a normal state.

As the glass panel 110 is continuously transported by the carrier 120, the plurality of vision cameras 140 mounted in the exterior-light shield 130 sense an entire screen of the glass panel 110.

The glass panel 110, the screen of which is completely sensed, is determined to be a good product or a defective product according to the results determined by the analyzing system. The glass panel 110, having been determined to a good product or a defective product, is transported to and stacked on a corresponding one of the following process stations 220 and 240. Specifically, a liquid crystal panel, having been determined to a good product, is transported to a following first process station 220, and a liquid crystal panel, having been determined to be a defective product, is transported to a following third process station 240 to thereby be transported to a repair process station.

Meanwhile, if the entire screen of the glass panel 110 is not be completely sensed via one sensing operation, the carrier 120 may be driven in reverse, to perform an additional screen sensing operation. In this case, the completely inspected liquid crystal panel is transported to a following second process station 230 and is subjected to following manufacturing processes.

During the screen sensing operation of the liquid crystal panel, the lower polarizer 150 and the upper polarizer 190 are rotated by preset angles, respectively, to inspect, for example, gap defects and rubbing defects of the glass panel 110, and other defects due to impurities.

Figure 8:
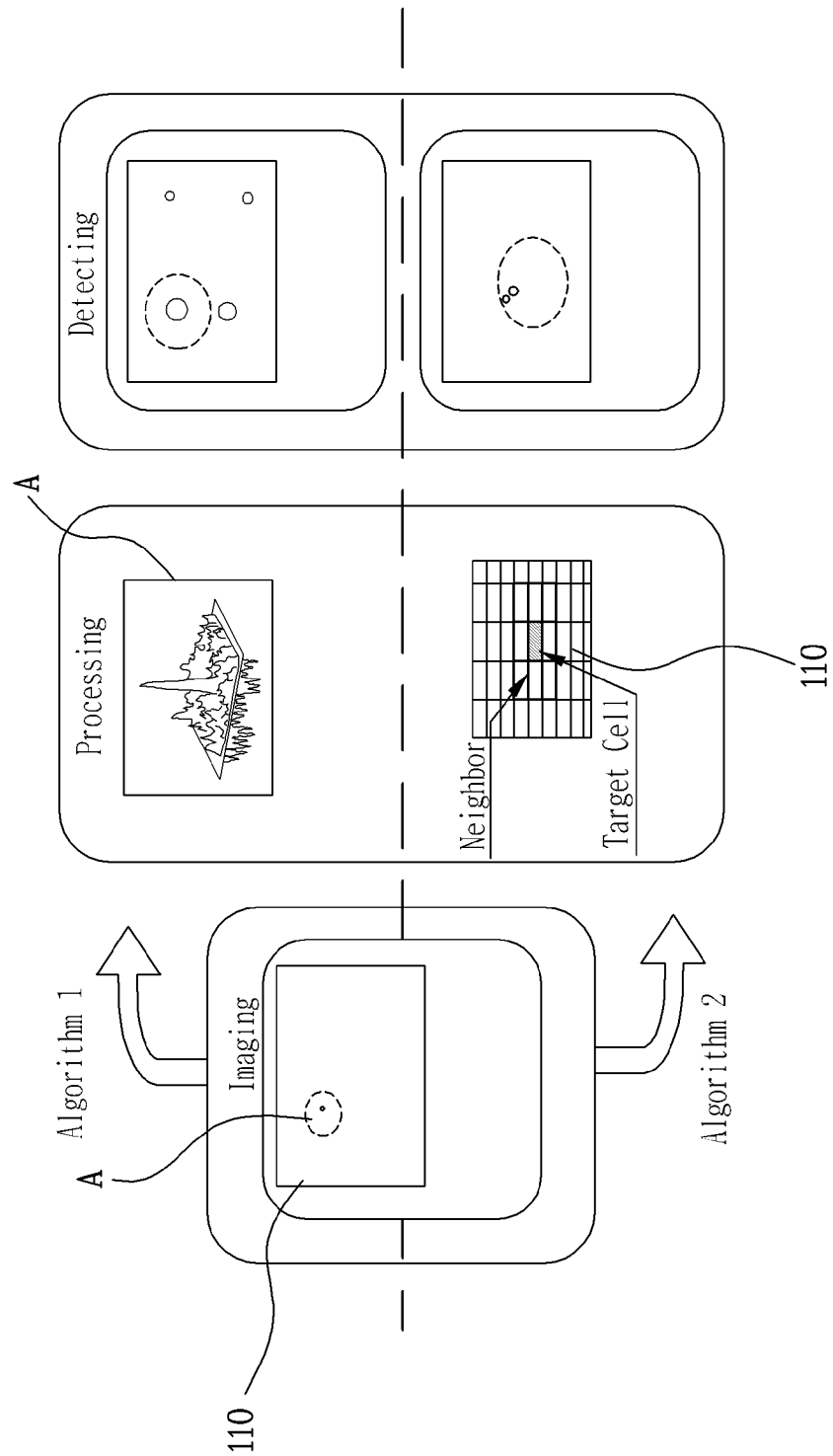

Screen information of the liquid crystal panel sensed by the plurality of vision cameras 140 is collected by the analyzing system. The analyzing system collects the sensed information input from the plurality of vision cameras 140 and determines the presence of screen defects of the glass panel 110 on a per pixel basis, as shown in FIG. 8.

The sensed information indicating whether the liquid crystal panel is a good product or a defective product is transmitted to a host system that serves to control the overall manufacturing processes. As the sensed information indicating whether the liquid crystal panel is a good product or a defective product is transmitted to a following process station, a desired following process can be performed in response to the transmitted information, resulting in an improvement in manufacturing efficiency of liquid crystal display devices.

On the basis of the sensed information of the entire screen of the glass panel 110 on a per pixel basis, pixels of the entire screen are rearranged. Thereafter, if data of a specific pixel differs from data of surrounding pixels, as shown in FIG. 8, the data of the specific pixel is amplified. Through this process, the presence of defects of the specific pixel and the type and degree of the defects can be accurately inspected.

Also, if a plurality of liquid crystal panels, inspected using the above-described inspection apparatus 100, has the same specific defects, the analyzing system will display information of the same specific defects. This means that the defects of the plurality of glass panels 110 are caused during the manufacture of the glass panels 110 or on the stage of product design.

In this case, the manufacture of the liquid crystal panel must be stopped, and appropriate follow-up measures must be performed, based on a determination as to a cause for the defects, to prevent repeat occurrence of the defects.

For example, if all the produced liquid crystal panels have the same defects due to a failure of a specific process included in the manufacturing method, this seriously disrupts production, causing an enormous time and costs for correction of the failure.

With the above-described inspection apparatus and inspection method for liquid crystal display devices according to the embodiment of the present invention, screen defects of a plurality of glass panels manufactured via a mass production method are quantified, whereby defects of glass panels due to failures of manufacturing processes or design failures and other problems attendant on the defects can be prevented.

Although the above embodiment of the present invention describes the inspection apparatus and inspection method for use in the large-size glass panel, the present invention is not limited thereto, and may be equally applied to individual liquid crystal panels obtained by cutting the large-size glass panel.

As apparent from the above description, the present invention provides an inspection apparatus and inspection method for liquid crystal display devices, which can automatically inspect defects of glass panels on a per pixel basis by analyzing information of an entire screen of each glass panel acquired by a plurality of vision cameras, differently from the prior art in which defects of a glass panel, more particularly, a liquid crystal panel screen are visually inspected by an inspector. With this automated inspection, improved inspection accuracy and consequently, improved product quality can be accomplished. In addition, the automated inspection apparatus has the effect of reducing inspection time, resulting in an improvement in productivity of liquid crystal display devices.

Furthermore, according to the present invention, screen defects of a plurality of glass panels manufactured via a mass production method can be quantified. This has the effect of preventing defects of glass panels due to failures of manufacturing processes or design failures and other problems attendant on the defects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An inspection apparatus of inspecting a screen defect of a liquid crystal display device comprising:

a carrier to sequentially transport each glass panel having passed through a previous process station;

a backlight unit to irradiate light to a lower surface of the glass panel being transported by the carrier;

a lower polarizer disposed above the backlight unit, to polarize the light to be irradiated to the glass panel;

an upper polarizer to polarize the light emitted through the glass panel;

an exterior-light shield to define a darkroom in a region, to which the light is irradiated by the backlight unit, for inspection of a screen defect of the glass panel;

a plurality of vision cameras mounted in the exterior-light shield, to sense an entire display region of the glass panel; and an analyzing system to collect and analyze information sensed by the plurality of vision cameras, wherein the lower polarizer is configured to have two planes for a first mode inspection and a second mode inspection.

2. The inspection apparatus according to claim 1, wherein the upper polarizer has a lens form and is coupled to each vision camera.

3. The inspection apparatus according to claim 1, wherein the lower polarizer is rotated about a horizontal axis or a vertical axis by an angle of 45°, 90°, 135° or 180° by operation of a rotator.

4. The inspection apparatus according to claim 1, wherein each of the plurality of vision cameras converts optical signals, generated upon recognizing light incident thereon from a display screen of the glass panel, into electric signals, and quantifies sensed information of the display screen of the glass panel into digital signals to thereby transmit the digital signals to the analyzing system.

5. The inspection apparatus according to claim 4, wherein the analyzing system collects the sensed information input from the plurality of vision cameras, to detect the presence of the screen defect of the glass panel on a per pixel basis.

6. An inspection apparatus for liquid crystal display devices comprising:

sequentially transporting a plurality of glass panels into a darkroom by operation of a carrier, wherein each glass panel transported into the darkroom is disposed between a lower polarizer to polarize the light to be irradiated to the glass panel and an upper polarizer to polarize the light emitted through the glass panel;

irradiating light to a lower surface of each glass panel transported into the darkroom by use of a backlight unit under the lower polarizer;

sensing optical signals emitted from the glass panel and converting the optical signals into digital sensing signals by use of a plurality of vision cameras mounted in the darkroom; and collecting and analyzing the digital sensing signals to determine the presence of a defect of the glass panel on a per pixel basis, wherein the lower polarizer is configured to have two planes for a first mode inspection and a second mode inspection.

7. The inspection method according to claim 6, further comprising:

arranging the digital sensing signals to correspond to all pixels of the glass panel; and amplifying the digital sensing signals corresponding, respectively, to all the pixels of the glass panel.

8. The inspection method according to claim 7, further comprising:

showing information related to a same specific defect when all the plurality of glass panels have the same specific defect.

9. The inspection method according to claim 8, further comprising:

transmitting information, related to the presence of a defect of the glass panel on a per pixel basis, to a host system used to control an overall manufacturing process.

* * * * *